(12) United States Patent
Vikram

(10) Patent No.: US 7,673,292 B2
(45) Date of Patent: Mar. 2, 2010

(54) AUTO CONVERSION OF TESTS BETWEEN DIFFERENT FUNCTIONAL TESTING TOOLS

(75) Inventor: Ashish Vikram, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1452 days.

(21) Appl. No.: 11/032,932

(22) Filed: Jan. 11, 2005

(65) Prior Publication Data

US 2006/0156287 A1 Jul. 13, 2006

(51) Int. Cl.
*G06F 9/44* (2006.01)
*G06F 11/00* (2006.01)

(52) U.S. Cl. .................. 717/135; 717/115; 717/126; 714/38

(58) Field of Classification Search ............. 717/115, 717/124, 136–139; 714/38
See application file for complete search history.

(56) References Cited

U.S. PATENT DOCUMENTS

| | | | |
|---|---|---|---|
| 5,923,675 | A | 7/1999 | Brown et al. |
| 6,067,652 | A | 5/2000 | Fusco et al. |
| 6,370,675 | B1 | 4/2002 | Matsumura et al. |
| 6,421,822 | B1 | 7/2002 | Pavela |
| 6,530,039 | B1 * | 3/2003 | Yang ................ 714/38 |
| 6,586,953 | B1 | 7/2003 | Okayasu |
| 6,651,205 | B2 | 11/2003 | Takahashi |
| 6,691,077 | B1 | 2/2004 | Burns et al. |
| 7,272,753 | B2 * | 9/2007 | Kaplan et al. ............ 714/38 |
| 7,406,626 | B2 * | 7/2008 | Shen et al. ............ 714/38 |
| 2004/0194065 | A1 * | 9/2004 | McGrath et al. ......... 717/124 |
| 2005/0010898 | A1 * | 1/2005 | Ogawa et al. ........... 717/106 |
| 2005/0188271 | A1 * | 8/2005 | West et al. ............. 714/38 |
| 2005/0223360 | A1 * | 10/2005 | Seeman et al. .......... 717/124 |
| 2005/0223361 | A1 * | 10/2005 | Belbute ................. 717/124 |

FOREIGN PATENT DOCUMENTS

WO WO 94/11818 5/1994

OTHER PUBLICATIONS

Bouquet et al., "Reification of Executable Test Scripts in Formal Specification-Based Test Generation: The Java Card Transaction Mechanism Case Study"; FME 2003, LNCS 2805, 2003, pp. 778-795.*

"Rational Robot User's Guide", ver. 2003.06.00; Rational Software Development Company, 2003, 400 pg.*

* cited by examiner

*Primary Examiner*—Wei Y Zhen
*Assistant Examiner*—Ryan D Coyer
(74) *Attorney, Agent, or Firm*—Schmeiser, Olsen & Watts; William H. Steinberg

(57) ABSTRACT

A method and system are described for migrating test scripts written for a current test tool (CTT) to a new test tool (NTT). A conversion tool sets the CTT in a playback mode and the NTT in a record mode. The CTT provides actions to an application under test (AUT) causing objects to be created and modified. The NTT monitors the actions of the CTT and creates a script to mimic the actions of the CTT. The current test script is modified to add comments, and translated using standard translation tools. Application-specific statements do not translate and are replaced with those previously created by the NTT in the record mode. This results in a script that performs the same functions as the original test script.

28 Claims, 6 Drawing Sheets

AUTO CONVERSION OF TESTS BETWEEN DIFFERENT FUNCTIONAL TESTING TOOLS

BACKGROUND OF THE INVENTION

1. Technical Field

The present invention relates to an automated system for software test script conversion, and more specifically, to an automated system for software test script conversion from a current software test script to new software test script.

2. Related Art

There are automated software test tools on the market to test lines of code being developed. These tools run scripts to test software routines that are being developed. Each test tool uses different internal language to save test scripts and different formats to store data. When a company would like to change from one test tool to another, the migration of test scripts from a current test tool (CTT) to a new test tool (NTT) could become tedious.

Currently, there is a need for an automated system capable of converting test scripts created by one functional testing tool to be able to be run on a new functional testing tool with little or no manual conversion.

SUMMARY OF THE INVENTION

The present invention may be described as a method for converting a current test script intended for use in a current test tool (CTT), to a script intended for use in a new test tool (NTT), comprising:
 a) providing the CTT capable of playing back actions of said current test script in a playback mode;
 b) providing the NTT capable of recording actions and for creating a test script from the recorded actions;
 c) providing a communication channel between the CTT and the NTT;
 d) starting the CTT in the playback mode, causing the CTT to produce actions, create objects and modify objects;
 e) starting the NTT in a record mode, causing the NTT to record actions provided to the NTT, object definitions of objects created, and object states of objects modified; and
 f) providing the actions produced by the CTT to the NTT, providing indications of objects created by the CTT to the NTT, and providing indications of objects modified by the CTT to the NTT through the communication channel, thereby causing the NTT to record provided actions and indications of objects created and modified and result in a recorded script having functionality similar to that of the current test script.

It may also be embodied as a method of converting from a current test script having application-specific statements and general statements that is capable of being run in conjunction with a current object map and current supporting data on a current test tool (CTT), to a new test script having application-specific statements and general statements that is capable of being run in conjunction with a new object map and new supporting data on a new test tool (NTT), the method comprising the steps of:
 a) inserting comment statements into the current test script to indicate a location of application-specific statements to create a commented script;
 b) playing back the commented script using the CTT causing objects to be created and modified, and actions on the objects to be performed, and messages to be sent to the NTT identifying which application-specific statements are encountered in the commented script,
 c) creating with the NTT, statements of a flat script which will mimic the actions performed by the CTT and current test script;
 d) monitoring, with the NTT when a comment has been encountered by the CTT, and placing the comment before the last created statement indicating a module name and line number of a script statement being run by the CTT which produced the comment;
 e) recording object information when the message is received from the CTT;
 f) creating a new object map from the object information recorded;
 g) translating the commented script from a language of said CTT into a language compatible with the NTT, to create a converted script having application-specific statements identified by comments and general statements;
 h) identifying a first set of application-specific statements from the converted script which correspond to a second set of application-specific statements in the flat script; and
 i) replacing the first set of application-specific statements in the converted script with the corresponding second set of application-specific statements from the flat script to result in a merged script which may be run with the new object map and supporting the NTT with some modification.

The invention may also be a system for translating a commented script for a current software functional test tool (CTT) into a test script for a new software functional testing tool (NTT) comprising:
 a) a graphic user interface (GUI) for interacting with a user to define input to the system and for displaying information back to the user; and
 b) a conversion tool in communication with the GUI, said CTT and said NTT adapted to:
  i. cause said CTT to run the commented script to create and modify objects and provide stimuli to the GUI (GUI actions) which in turn provides input to an application under test (AUT), and to perform verification point (VP) checks, and
  ii. cause said NTT to monitor and record the GUI actions, the VP checks, object definitions, object states, and create new GUI statements and new VP statements which, when played back by said NTT perform the GUI actions and VP checks;
 c) a translator functioning to receive the commented script and to provide the converted script in a different language; and
 d) an intelligent merge device coupled to the translator and adapted to:
  i. receive the converted script and the new GUI statements and the new VP statements,
  ii. identify corresponding statements of each received new GUI statement and new VP statement in the converted script, and
  iii. replace the corresponding statements in the converted script with the received new GUI statements and VP statements.

The present invention may also be described as a method of providing a service for converting a current test script intended for use in a current test tool (CTT), to a script intended for use in a new test tool (NTT), the service comprising:
 a) providing the CTT capable of playing back actions of said current test script in a playback mode;
 b) providing the NTT capable of recording actions and for creating a test script from the recorded actions;

c) providing a communication channel between the CTT and the NTT;
d) starting the CTT in the playback mode, causing the CTT to produce actions, create objects and modify objects;
e) starting the NTT in a record mode, causing the NTT to record actions provided to the NTT, object definitions of objects created, and object states of objects modified; and
f) providing the actions produced by the CTT to the NTT, providing indications of objects created by the CTT, to the NTT and providing indications of objects modified by the CTT, to the NTT through the communication channel, thereby causing the NTT to record provided actions and indications of objects created and modified and result in a recorded script having functionality similar to that of the current test script.

And the present invention may be employed as a computer program product, comprising a computer usable medium having computer readable program code embodied therein for converting a current test script intended for use in a current test tool (CTT), to a script intended for use in a new test tool (NTT), said computer readable program code including an algorithm adapted to:
a) providing a CTT capable of playing back actions of said current test script in a playback mode;
b) providing an NTT capable of recording the actions played back by the CTT and for creating a test script from the recorded actions;
c) providing a communication channel between the CTT and the NTT;
d) starting the CTT in the playback mode, causing it to produce actions, create objects and modify objects;
e) starting the NTT in a record mode, causing it to record actions provided to it, object definitions of objects created and object states of objects modified; and
f) providing the actions produced by the CTT to the NTT, providing indications of objects created by the CTT to the NTT, and providing indications of objects modified by the CTT to the NTT through the communication channel, thereby causing the NTT to record provided actions and indications of objects created and modified and result in a recorded script having functionality similar to that of the current test script.

Figure 1:
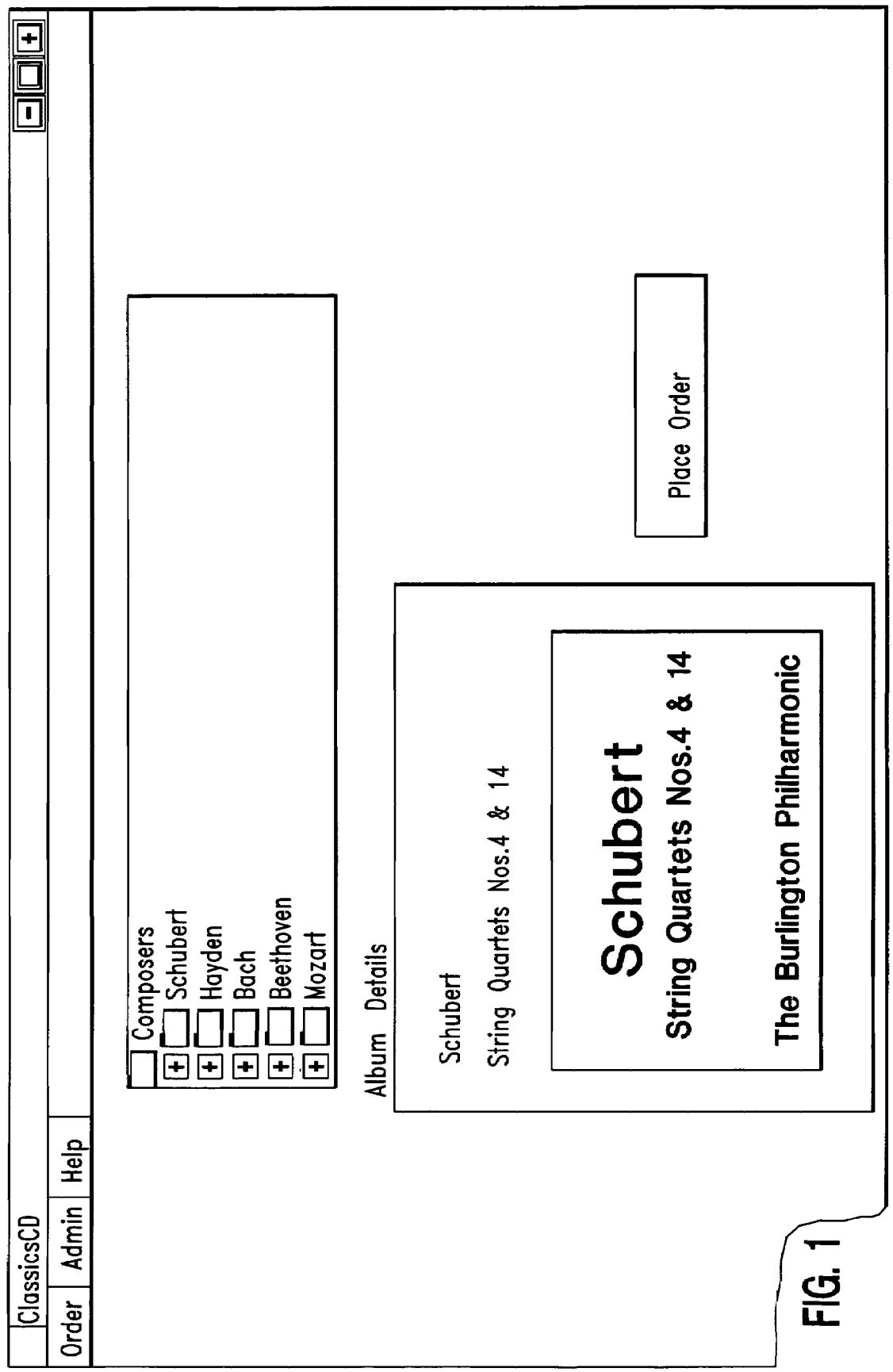
FIG. 1 is an illustration of a graphical user interface (GUI) displaying a screen output (a "screen shot") resulting from the selection of the object "Shubert" from a Java tree structure having a number of objects, in accordance with embodiments of the present invention.

Appendix A is a listing of a current test script for a CTT that is intended to be converted to an equivalent script that will run on an NTT.

Appendix B is a listing of a commented script created by adding 'Sendcomment' statements to the script listing of Appendix A.

Appendix C is a listing of a recorded script recorded by the NTT.

Appendix D is a listing of a flat script created by copying lines of the commented script of Appendix B into the recorded script of Appendix C.

Appendix E is a listing of an augmented script created by adding comment lines to the current test script of Appendix A.

Appendix F is a listing of a converted script created by applying a language translator to the augmented script of Appendix E.

Appendix G is a listing of a merged script created by replacing application-specific statements in Appendix F with equivalent application-specific statements relating to the NTT.

Appendix H is a listing of a final script created by modifying the programming structure of the merged script of Appendix G.

DETAILED DESCRIPTION OF THE INVENTION

Automated functional testing of software routines that are being developed insures quality of the software.

Currently, there are such functional testing tools on the market to test the functionality of software being developed, referred to as an application under test (AUT). These tools function by recording user actions provided through a graphical user interface (GUI) during a 'learning phase' and later playing them back automatically. During recording, the tool captures user actions such as mouse click on a certain GUI object, keyboard input etc.

The user can also record what is known as verification Points (VP). A Verification Point is used to capture the state of a specified GUI object. Typically, the recording produces a script in some programming language and may also produce an Object Map and a Verification Point Map.

During playback the tool compiles (or interprets) the script and plays it back. This causes the same GUI actions to be played back on the GUI objects. When a VP is encountered in the script, it recaptures the state of the specified GUI object and compares them with the stored state values. The test succeeds if the values at the VP match stored values, and fails otherwise.

Each tool records scripts in its own preferred programming language such as Visual Basic, Java, etc. Each tool also handles object identification and VPs differently.

Prior art attempts at automated conversion of scripts focused solely on language conversion techniques to convert from one script language to another. They also attempted to convert object recognition (or identification) methods from one format to another. The prior art tools do a reasonable job of converting from one scripting language to another, but do not adequately convert between the different ways of identifying objects.

Therefore, the prior art tools can convert only about 60-70% of each script. A large amount of manual work is required to correctly convert the object identification and VP information.

In general, conversion by reading the information stored in the scripts and test assets without having the actual GUI object maps for the AUT available at the time of conversion ("static conversion") of object identification information is a large problem. For example, commercial, publicly available functional testing tools for testing AUTs with graphical interfaces, such as RATIONAL ROBOT™ ("ROBOT") may identify an object in the AUT by the following script statements:
   Window SetContext, "Caption=ClassicsCD", " "
   JavaTree Expand, "JavaCaption=ClassicsCD;\; Type=JavaTree;Index=1",
   "Text=Composers->Schubert"

The above two statements are generated for a Java application when the user clicks on the "+" sign next to the "Schubert" in the Java tree shown in the AUT main GUI window of FIG. 1, in accordance with embodiments of the present invention.

Figure 2:
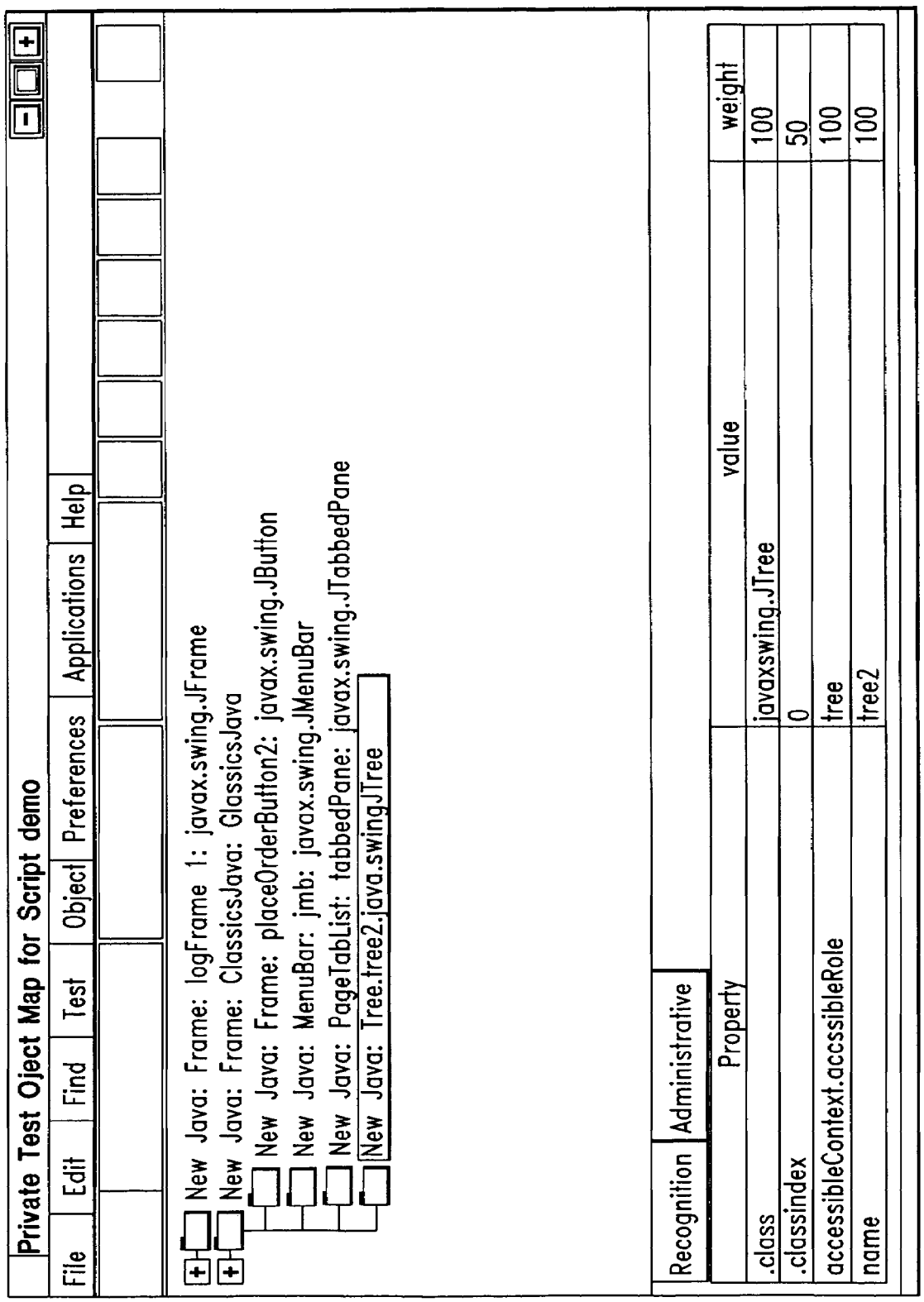
FIG. 2 is an object map created by a GUI when the object "Shubert" is selected in FIG. 1.

In an NTT employing functional testing software product, such as the commercial, publicly available XDE TESTER™, the corresponding GUI action is executed by the following script statement:

tree(   ).click(atPath("Composers->Schubert->Location (PLUS MINUS)"));

Where tree( ) is a function call to access one of the GUI objects generated by XDE TESTER™ in the object map created while recording the above 'click' action. The object map for tree( ) is shown in FIG. 2.

Creating the above object map without examining the AUT GUI is not possible. The script statements that identify this object and perform the click action do not contain enough information to statically fill the recognition information used to identify the tree object in XDE TESTER™. (For example, there is no way to statically determine that the name of the object is "tree2" since the script uses "Index=1" to identify the 1st tree object in the AUT GUI rather than identifying it by the internal java name.)

Also in general a GUI object on which an action is being performed may not be created unless a sequence of user actions is performed on the AUT. For example, an "OK/Cancel" confirmation box is created only when a certain user action is performed. Therefore to reliably create any particular GUI object, the sequence of user actions recorded in the original script must be followed.

Because of the above reasons the current conversion techniques that attempt to convert test scripts statically treating it as a problem similar to that of converting between programming languages are unsuccessful in converting the object recognition strings from one test tool to another and therefore cannot convert a significant part of each script.

The proposed invention is able to convert complete test scripts between functional testing tools including program structure, object recognition strings and VP data.

Figure 3:
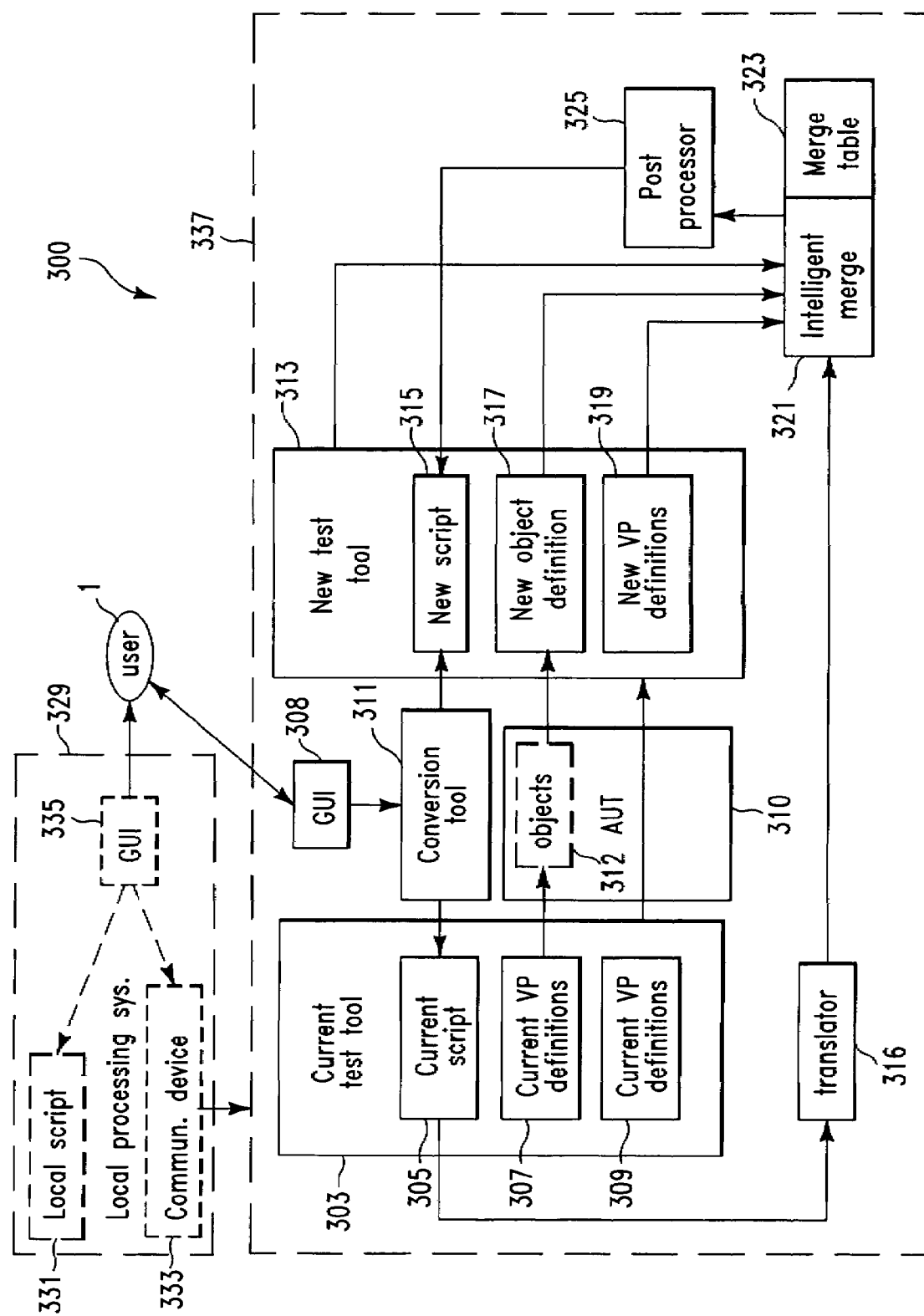
FIG. 3 is a simplified block diagram of one embodiment of the present invention.

FIG. 3 shows a simplified block diagram of one embodiment of a script conversion system 300 according to the present invention. Script conversion system 300 includes a GUI 308, a CTT 303, an NTT 313, and a conversion tool 311, a translator 316, an intelligent merge device 321, a merge table 323 and a post processor 325.

A user 1, acting through GUI 308 interacts with conversion tool 311 to start CTT 303 in a playback mode where it runs current test script 305 and AUT 310. AUT 310 causes objects 312 to be created from current object definitions 307. Current test script 305 also provides GUI actions and other input to be provided to the AUT 310. These actions cause AUT 310 to change the states of objects 312.

The current test script has one or more VPs defined in current VP definitions 309 in which the actions are recorded, the objects affected by the actions are identified, the state of the affected objects are compared with stored comparison data to identify if the AUT has correctly performed up to this point.

Any or all of the functional blocks of FIG. 3 may be operated as discrete routines stored in memory and run by a dedicated processor. These processors may be linked to receive input and provide output from other functional blocks.

Any number of these may be grouped together and stored in different locations of a memory which is accessed by a processor. The processor will time slice and run each of the routines as necessary.

NTT 313 is started in the record mode and records the actions (GUI and other actions) of CTT 303 that is running in playback mode. NTT 313 creates statements of a script which would perform the same functions as the CTT 303.

Figure 4A:
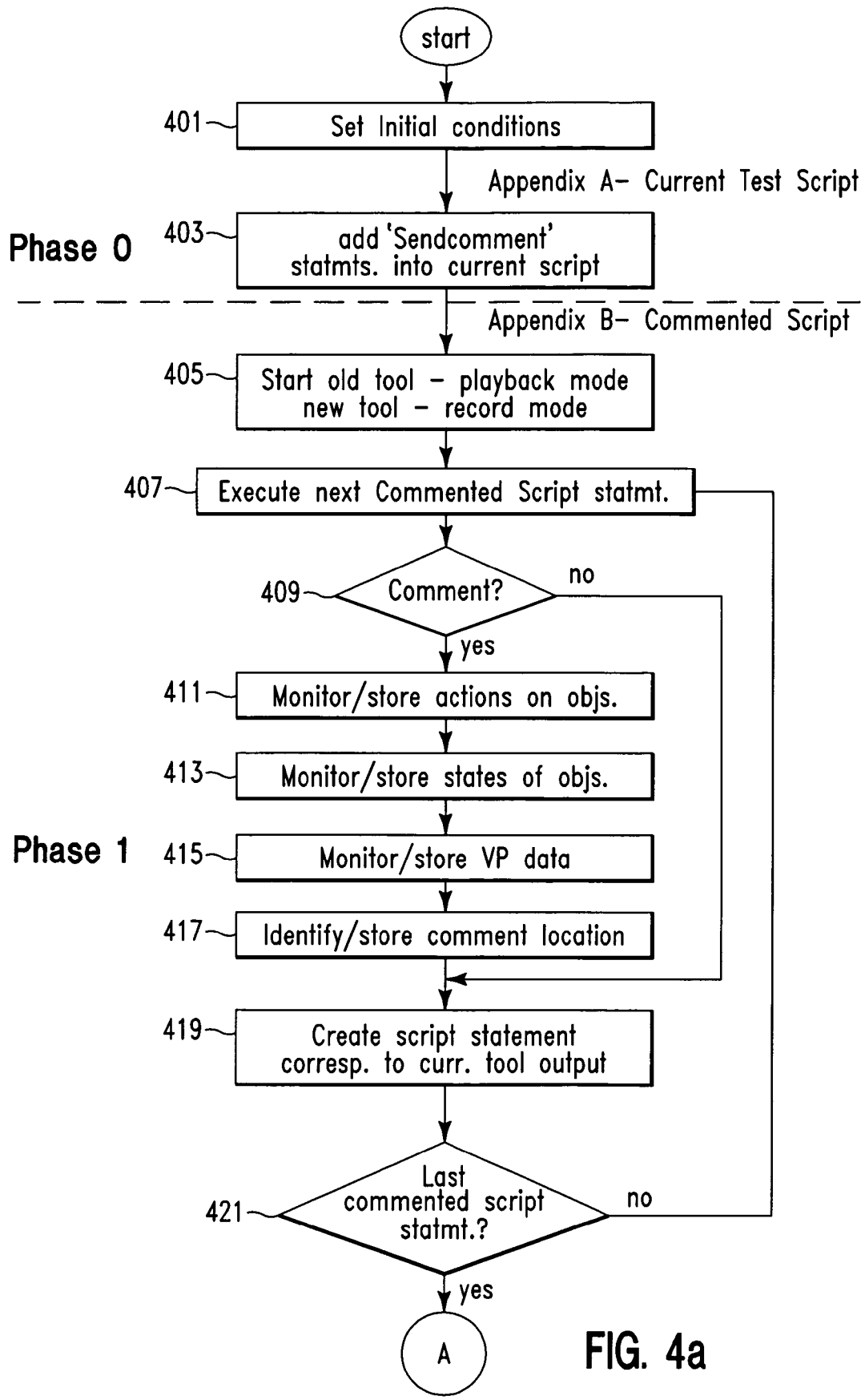
FIGS. 4a and 4b together show a flowchart of the operation of the present invention.
Figure 4B:
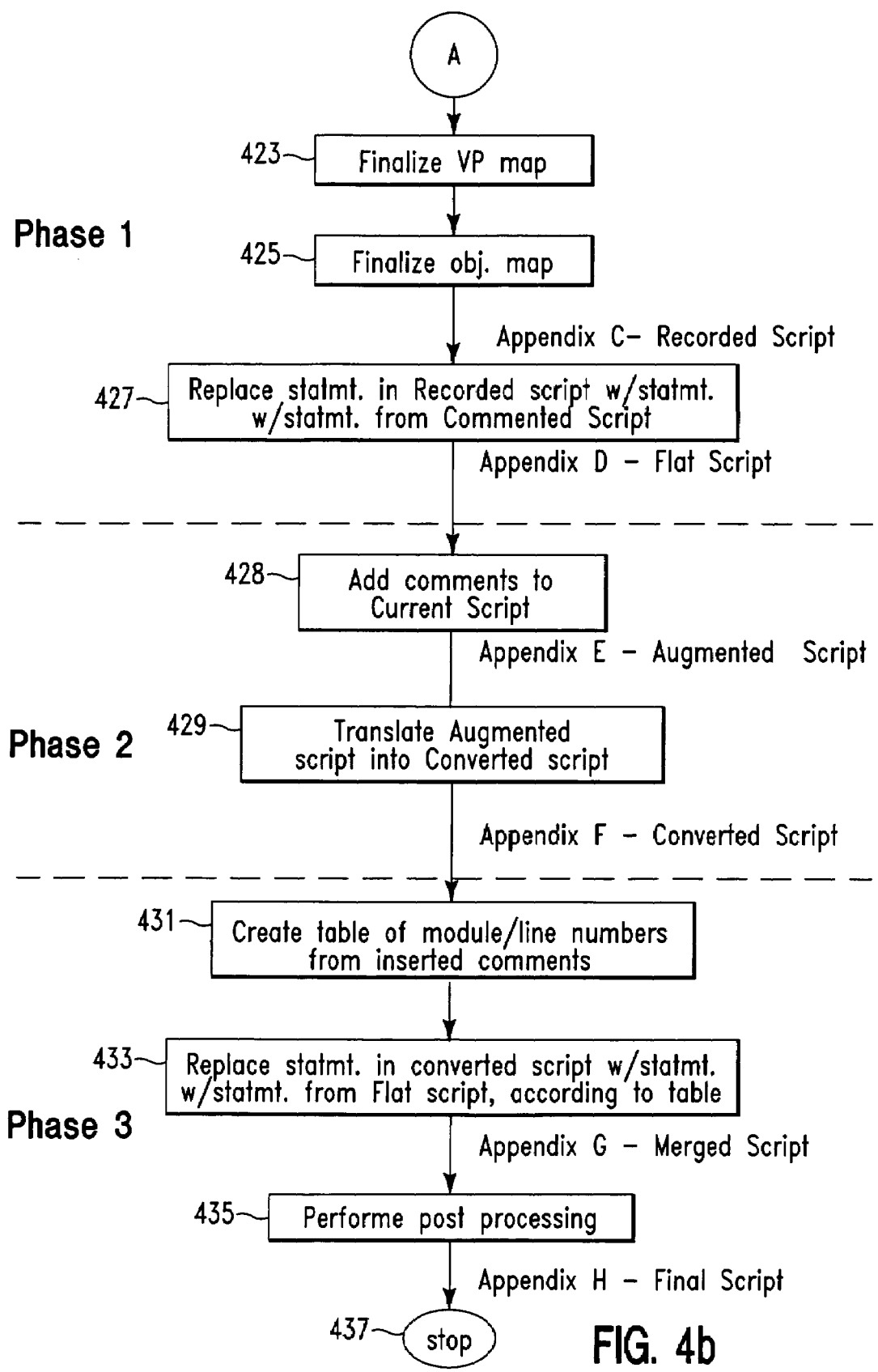

An example conversion according to the present invention is described in conjunction with FIGS. 3, 4a, 4b and Appendices A-H. This example employs commercial, publicly available RATIONAL ROBOT™ functional testing software running on a processor as CTT 303, and commercial, publicly available XDE TESTER™ functional testing software running on a processor as NTT 313. These were chosen as an example, but the same principles can be applied to conversion of scripts of other functional test tools.

An example of a current test script 305 which runs on the CTT 303 is referred to as the current test script and is shown in Appendix A. The current test script is intended to be converted to a test script which will run on an NTT 313.

In step 401 of FIG. 4a, a user 1 interacts with a conversion tool 311 of script conversion system 300 to set the initial conditions of the CTT 303 running current test script 305 through GUI 308. Conversion tool 311 then starts both the CTT 303 and NTT 313 in a testing environment allowing actions to objects and the output of CTT 303 to be recorded by the NTT 313.

Phase 0—Insert Comments

Since test tools each use their own unique way of identifying objects, and storing information about VPs, these (application-specific) statements should be replaced with statements corresponding to the NTT 313.

In step 403, "Sendcomment" statements are added by user 1 acting through GUI 308 and conversion tool 311 into the file of Appendix A. These Sendcomment statements indicate the location of the source statement in the current test script (Appendix A). They identify the module and line number for later identification. These statements are placed in the code at points where GUI statements, and other application-specific statements occur. When these Sendcomment statements are executed in the current test script 305, they will cause special comments to be added to the file created during the playback phase. These comments are used to mark statements that contain object recognition strings, GUI actions, VPs or other application-specific statements for later replacement. This script is referred to as commented script as shown in Appendix B after modification.

Phase 1—Simultaneous Playback and Record

In step 405, user 1, through GUI 308, causes conversion tool 311 to set an environment variable that tells CTT 303 and NTT 313 that they will operate in the special 'convert' environment. CTT 303 and NTT 313, running in the convert environment, set up a communication channel using a socket when the above environment variable is set.

In step 405, user 1, through GUI 308, also causes conversion tool 311 to simultaneously start CTT 303 in the playback mode, and NTT 313 in the record mode. CTT 303 plays back the commented script of Appendix B having inserted statements to generate and send special comments to NTT 313.

In step 407, CTT 303 executes the next statement of commented script. The communication channel between the CTT 303 and NTT 313 also is used to send an "insert comment" message when the SendComment statement is executed in current test script 305 being played back by CTT 303. This causes NTT 313 to add a comment to recorded script (Appendix C) being generated as part of the record mode stored in new script 315.

In step 409 it is determined by CTT 303 if the statement being processed is marked by a special comment. If the answer is "no", then the process continues at step 419.

If the answer is "yes", a commented statement is encountered, then in step 411 the actions of CTT 303 on objects 312 are monitored and stored as well as definitions of the objects acted upon as new object definitions 317.

In step 413, the states of the objects affected are stored.

In step 415, CTT 303 sends information about VPs to NTT 313 at the time that CTT 303 encounters a verification point in the current test script 305. The information sent includes a) the relative screen coordinates where the GUI object whose properties or data need to be verified and b) information about which properties or other data which need to be compared as part of this particular VP.

When a VP is encountered, NTT 313 a) records object properties and data from the GUI, or other object at the point indicated, and b) records information about which object or which data needs to be compared at the VP.

In step 419, a flat script statement is created by NTT 313 and added to new script device 315. These statements perform the same function when run on NTT 313 as the current test script statements executed by CTT 303.

If NTT 313 cannot create a statement equivalent to that of CTT 303, then an indication is written in the new script device 315 indicating which statement from the current test script (by line number and module) for which no equivalent statements exist.

In step 423, an object map is completed by NTT 313 from the object information stored during the course of recording in new object definitions 317.

Similarly, in step 425, a VP map is completed by NTT 313 from the VP information stored during the course of recording stored in new VP definitions 319.

After step 425, a recorded script, shown in Appendix C, is completed as a result of the simultaneous playback by CTT 303 and record by NTT 313.

In step 427 conversion tool 311 reads the module and line number from recorded script (Appendix C) then finds the module and line in the commented script (Appendix B) and copies them to the recorded script (Appendix C) to result in flat script (Appendix D) and stores it in new script device 315.

During recording in steps 401 through 425 (Phase 1), NTT 313 has created the object map for various objects 312 in the AUT and created a VP map just as it would do if the user were to record the above actions and VPs manually. The script of Appendix C may be run in NTT 313 and would do the same test as the original CTT script (current test script of Appendix A, and its library) that has been converted. However, programming constructs such as loops, 'if' statements, arrays and function calls present in the original are not present in the above recorded script of Appendix C. The programming constructs are important to retain to a) make the test scripts more compact and maintainable and b) allow the scripts to function during error conditions or in different configurations.

The remainder of the conversion process of the present invention is performed to restore the original programming structure.

In the recording steps of Phase 1, conversion tool 311 has recorded the module name and line number information in the recorded script of Appendix C.

Phase 2—Language Conversion

In step 428 comment statements are added into the current test script (Appendix A) to mark application-specific statements and to identify the module and line number of where object actions and VPs occur to create an augmented script (Appendix E).

In our example, CTT 303 was chosen to be RATIONAL ROBOT™ functional testing software, which is compatible with scripts written in SQA Basic language. NTT 313 was chosen to be XDE TESTER™ functional testing software which runs and creates scripts written in Java language. Therefore, the scripts must be converted from SQA Basic to Java.

Please note that RATIONAL ROBOT™ and XDE TESTER™ were only chosen as examples. Either may be used for the CTT or the NTT. Other publicly available functional testing software products that also will fulfill the requirements of both the CTT and the NTT would be WINRUNNER® by Mercury Interactive Corporation and SILKTEST® by Segue Software, Inc. Other newer software products which will be more commonly used in the future that also fulfill the requirements of the CTT and the NTT are QUICKTEST® by Mercury Interactive Corporation and E-TEST SUITE® by Empirix, Inc. There are other commercial, publicly available functional testing software products which are capable of playing back actions of a test script in a playback mode and/or are capable of recording actions, and creating a new test script from the recorded actions which may be employed in one or both of the CTT and NTT.

The invention can also be used to convert scripts from one company's functional testing tool to another company's functional testing tool.

In step 429, translation is performed by known methods, such as by running an off-the-shelf Visual Basic to Java converter on the SQA Basic files. One such converter is distributed by Diamond Edge (www.diamondedge.com). The resulting augmented script is listed in Appendix E. Please note that there are certain application-specific statements which will not convert. These include GUI statements, and VP statements.

At this point, Phases 1 and 2 of the conversion process have been completed. Flat script (Appendix D) contains the script recorded by NTT 313 during the simultaneous record and playback of Phase 1. This file also contains a recording of GUI actions (clicks, etc.), the way NTT 313 references GUI objects and the way XDE TESTER™ references VPs. The object map and verification point map required by NTT 313 also have been created.

At the end of Phase 2, converted script (Appendix F) has been created. This script has been converted to the Java language after being translated from the Basic language. These files have the Java program structure; however, the application-specific statements are in the format for CTT 303. These statements currently have no meaning to NTT 313.

Phase 3—Merge Assets of Phases 1 and 2

The recorded actions to objects, recorded object definitions, VP map and object map created in Phase 1 are intelligently merged with the converted script (Appendix F) created in Phase 2 to create the final script (Appendix H).

First, the intelligent merge is performed. This uses the special comments present in the files created in both Phase 1 and Phase 2 to aid in the merge process.

In step 431, a merge table is created by an intelligent merge device 321 identifying module, line number and the corresponding application-specific statement in converted script (Appendix F). The table is stored in merge table storage 323.

In step 433, converted script statements (Appendix F) having a counterpart in the merge table are replaced with corresponding table entries by intelligent merge device 321. The merge results in a merged script as listed in Appendix G.

Note that the merge process also identifies portions of the original test script that did not get executed during the playback because of conditional code and inserts comments indicating that this portion of the code could not be converted during this playback. The user can use the restartable feature explained in the presentation to run the playback under different start conditions or using a different configuration that would cause this portion of the code to be executed and the results merged into the converted files. Portions of the converted code that cannot be asserted to be done correctly may also be marked.

In step 437, post processor 325 performs miscellaneous clean-up and modifications to meet the requirements of the NTT 313. It functions to remove unnecessary headers, adds required headers and 'includes', inserts "t_int" functions and calls to this function for verification point results, converts 'static' functions to 'non-static', adds object instantiations for library classes and other format functions. The resulting final script is shown in Appendix H.

In FIG. 3, an alternative embodiment is shown in dashed lines. A user 1 is co-located with a local processing system 329. A current test script (Appendix A) desired to be converted for use on an NTT is prestored in local script device 331. User 1 desires to connect to a remote processing system 337 to have current test script converted to a script that will run on NTT 313. In this example, user 1 interacts through GUI 335 of local processing system 329 to send current test script, an identification of the CTT and the NTT and other required data over a communication channel (such as a LAN, WAN or Internet) by a communication device 333 to remote processing system 337.

The conversion tool 311 receives the current test script and stores it in the current test script 305. Conversion tool also stores the required data in the appropriate locations within remote processing system 337.

The elements of the remote processing system 337 function as described above to create a final script (Appendix H). The final script is then returned to the local processing system 329.

Remote processing system 327 may then charge user 1 for the services provided via electronic commerce.

Figure 5:
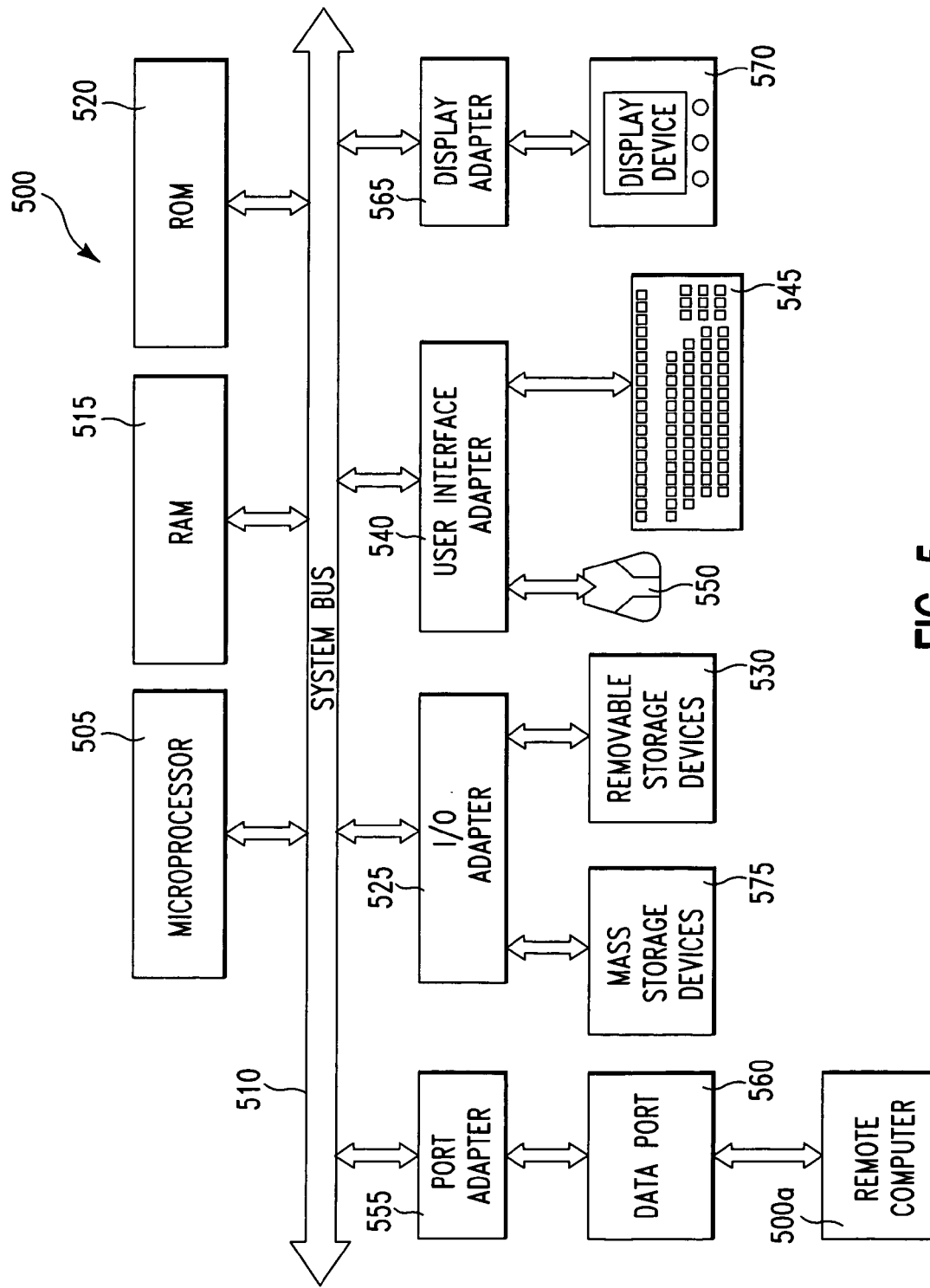
FIG. 5 is a simplified block diagram of a computer system capable of implementing the present invention.

FIG. 5 shows a schematic block diagram of a general-purpose computer 500, 500a which may be employed to perform the functions of one or more of the functional blocks of the present invention shown in FIG. 3.

Wherein the methods may be coded as a set of machine-readable instructions and stored on removable or hard disk media for use by the general-purpose computers. In FIG. 5, a computer system 500 has at least one microprocessor or central processing unit (CPU) 505. CPU 505 is interconnected via a system bus 510 to a random access memory (RAM) 515, a read-only memory (ROM) 520, an input/output (I/O) adapter 525 for communicating with a removable data and/or program storage device 530 and a mass data and/or program storage device 575. It is also connected to a user interface adapter 540 for connecting a keyboard 545 and a mouse 550, a port adapter 555 for connecting a data port 560 such as a network interface adapter (NIC) and a display adapter 565 for connecting a display device 570. The NIC may be used to connect to remote databases and computers.

ROM 520 contains basic operating system instructions for computer system 500. The operating system may alternatively reside in RAM 515 or elsewhere as is known in the art. Examples of removable data and/or program storage device 530 include magnetic media such as floppy drives and tape drives and optical media such as CD ROM drives. Examples of mass data and/or program storage devices 575 include one or more hard disk drives and nonvolatile memory such as flash memory. These may be local or remote, directly connected, or connected through a network. In addition to keyboard 545 and mouse 550, other user input devices such as trackballs, writing tablets, pressure pads, microphones, light pens and position-sensing screen displays may be connected to user interface 540. Examples of display devices include cathode-ray tubes (CRT), plasma displays and liquid crystal displays (LCD).

A computer program may be created by one of ordinary skill in the art and stored on the system or a data and/or program storage device 530, or fed into the computer through a data port 560 and executed to practice the present invention.

It is also possible to have one or more other computers 500a linked to share, and/or all of the resources of computer 500.

While FIG. 5 shows the computer system 500 as a particular configuration of hardware and software, any configuration of hardware and software, as would be known to a person of ordinary skill in the art, may be utilized for the purposes stated above in conjunction with the use of computer system 500 of FIG. 5.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

APPENDIX A

Current Test Script

```
DEMO.REC
'$include 'demolib.sbl'
Sub Main
    Dim Result As Integer
    Dim names(2) as string
    Dim i as integer
    names(1) = "Composers->Schubert->String Quartets Nos. 4 & 14"
    names(2) = "Composers->Schubert->Symphonies Nos. 5 & 9"
    'Initially Recorded: 4/9/2003 12:33:25 PM
    'Script Name: demo
    Window SetTestContext, "Caption=ClassicsCD", ""
    Result     =     JavaTreeVP     (CompareProperties,
"JavaCaption=ClassicsCD;\;Type=JavaTree;Index=1", "VP=Object Properties")
    Window ResetTestContext, "", ""
    if Result then
        Window SetContext, "Caption=ClassicsCD", ""
        JavaTree   Expand,   "JavaCaption=ClassicsCD;\;Type=JavaTree;Index=1",
```

APPENDIX A-continued

Current Test Script

```
"Text=Composers->Schubert"
   else
      Window SetContext, "Caption=ClassicsCD", ""
      JavaTree    Expand,    "JavaCaption=ClassicsCD;\;Type=JavaTree;Index=1",
"Text=Composers->Schubert"
   end if
   for i = 1 to 2
      call func (names(i))
   next i
   Window SetContext, "Caption=ClassicsCD", ""
   JavaTree    Collapse,    "JavaCaption=ClassicsCD;\;Type=JavaTree;Index=1",
"Text=Composers->Schubert"
End Sub
DEMOLIB.SBL
sub func (param as string)
   Window SetContext, "Caption=ClassicsCD", ""
   JavaTree MakeSelection, "JavaCaption=ClassicsCD;\;Type=JavaTree;Index=1", "Text=" &
param
   PushButton Click, "JavaCaption=ClassicsCD;\;Type=PushButton;Name=Place Order"
   Window SetContext, "Caption=Member Logon", ""
   PushButton Click, "JavaCaption=Member Logon;\;Type=PushButton;Name=Cancel"
end sub
```

APPENDIX B

Commented Script

```
DEMOLIB.SBL.SENDC
declare function SendComment lib "rtplay.dll" alias
"?SendExternalComment@@YGHPAD@Z" (ByVal arg1 as String) as long
'$include 'demolib.sbl'
Sub Main
    Dim Result As Integer
    Dim names(2) as string
    Dim i as integer
    names(1) = "Composers->Schubert->String Quartets Nos. 4 & 14"
    names(2) = "Composers->Schubert->Symphonies Nos. 5 & 9"
    'Initially Recorded: 4/9/2003 12:33:25 PM
    'Script Name: demo
        call                                                SendComment
("module=e:\mck\TestDatastore\DefaultTestScriptDatastore\TMS_Scripts\demo.rec line=12")
    Window SetTestContext, "Caption=ClassicsCD", ""
        call                                                SendComment
("module=e:\mck\TestDatastore\DefaultTestScriptDatastore\TMS_Scripts\demo.rec line=13")
    Result = JavaTreeVP (CompareProperties,
"JavaCaption=ClassicsCD;\;Type=JavaTree;Index=1", "VP=Object Properties")
        call                                                SendComment
("module=e:\mck\TestDatastore\DefaultTestScriptDatastore\TMS_Scripts\demo.rec line=14")
    Window ResetTestContext, "", ""
    if Result then
        call                                                SendComment
("module=e:\mck\TestDatastore\DefaultTestScriptDatastore\TMS_Scripts\demo.rec line=17")
        Window SetContext, "Caption=ClassicsCD", ""
        call                                                SendComment
("module=e:\mck\TestDatastore\DefaultTestScriptDatastore\TMS_Scripts\demo.rec line=18")
        JavaTree Expand, "JavaCaption=ClassicsCD;\;Type=JavaTree;Index=1",
"Text=Composers->Schubert"
    else
        call                                                SendComment
("module=e:\mck\TestDatastore\DefaultTestScriptDatastore\TMS_Scripts\demo.rec line=20")
        Window SetContext, "Caption=ClassicsCD", ""
        call                                                SendComment
("module=e:\mck\TestDatastore\DefaultTestScriptDatastore\TMS_Scripts\demo.rec line=21")
        JavaTree Expand, "JavaCaption=ClassicsCD;\;Type=JavaTree;Index=1",
"Text=Composers->Schubert"
    end if
    for i = 1 to 2
        call func (names(i))
    next i
        call                                                SendComment
("module=e:\mck\TestDatastore\DefaultTestScriptDatastore\TMS_Scripts\demo.rec line=28")
    Window SetContext, "Caption=ClassicsCD", ""
        call                                                SendComment
("module=e:\mck\TestDatastore\DefaultTestScriptDatastore\TMS_Scripts\demo.rec line=29")
    JavaTree Collapse, "JavaCaption=ClassicsCD;\;Type=JavaTree;Index=1",
"Text=Composers->Schubert"
End Sub
DEMOLIB.SBL.SENDC
sub func (param as string)
        call                                                SendComment
("module=e:\mck\TestDatastore\DefaultTestScriptDatastore\TMS_Scripts\sqabas32\demolib.sbl line=2")
    Window SetContext, "Caption=ClassicsCD", ""
        call                                                SendComment
("module=e:\mck\TestDatastore\DefaultTestScriptDatastore\TMS_Scripts\sqabas32\demolib.sbl line=3")
    JavaTree MakeSelection, "JavaCaption=ClassicsCD;\;Type=JavaTree;Index=1", "Text=" &
param
        call                                                SendComment
("module=e:\mck\TestDatastore\DefaultTestScriptDatastore\TMS_Scripts\sqabas32\demolib.sbl line=4")
    PushButton Click, "JavaCaption=ClassicsCD;\;Type=PushButton;Name=Place Order"
        call                                                SendComment
("module=e:\mck\TestDatastore\DefaultTestScriptDatastore\TMS_Scripts\sqabas32\demolib.sbl line=6")
    Window SetContext, "Caption=Member Logon", ""
        call                                                SendComment
("module=e:\mck\TestDatastore\DefaultTestScriptDatastore\TMS_Scripts\sqabas32\demolib.sbl line=7")
    PushButton Click, "JavaCaption=Member Logon;\;Type=PushButton;Name=Cancel"
end sub
```

APPENDIX C

Recorded Script

DEMO.JAVA.RECORDED
import resources.demoHelper;
import com.rational.test.ft.*;
import com.rational.test.ft.object.interfaces.*;
import com.rational.test.ft.script.*;
import com.rational.test.ft.value.*;
import com.rational.test.ft.vp.*;
/**
* Description :XDE Tester Script
* @author av
*/
public class demo extends demoHelper
{
    /**
    * Script Name : <b>demo</b>
    * Generated    : <b>Jan 27, 2004 2:56:52 PM</b>
    * Modified     : <b>Jan 27, 2004 2:56:52 PM</b>
    * Description : XDE Tester Script
    * Original Host : WinNT Version 5.0 Build 2195 (Service Pack 4)
    *
    * @since 2004/01/27
    * @author av
    */
    public void testMain (Object[ ] args)
    {
    // ### module=e:\mck\TestDatastore\DefaultTestScriptDatastore\TMS_Scripts\demo.rec line=12
    // ### module=e:\mck\TestDatastore\DefaultTestScriptDatastore\TMS_Scripts\demo.rec line=13
    tree_standardVP( ).performTest( );
    // ### module=e:\mck\TestDatastore\DefaultTestScriptDatastore\TMS_Scripts\demo.rec line=14
    // ### module=e:\mck\TestDatastore\DefaultTestScriptDatastore\TMS_Scripts\demo.rec line=17
    // ### module=e:\mck\TestDatastore\DefaultTestScriptDatastore\TMS_Scripts\demo.rec line=18
    // Frame: ClassicsCD
    tree( ).click(atPath("Composers->Schubert->Location(PLUS_MINUS)"));
    // ### module=e:\mck\TestDatastore\DefaultTestScriptDatastore\TMS_Scripts\sqabas32\demolib.sbl line=2
    // ### module=e:\mck\TestDatastore\DefaultTestScriptDatastore\TMS_Scripts\sqabas32\demolib.sbl line=3
    tree( ).click(atPath("Composers->Schubert->String Quartets Nos. 4 & 14"));
    // ### module=e:\mck\TestDatastore\DefaultTestScriptDatastore\TMS_Scripts\sqabas32\demolib.sbl line=4
    PlaceOrder( ).click( );
    // ### module=e:\mck\TestDatastore\DefaultTestScriptDatastore\TMS_Scripts\sqabas32\demolib.sbl line=6
    // ### module=e:\mck\TestDatastore\DefaultTestScriptDatastore\TMS_Scripts\sqabas32\demolib.sbl line=7
    // Frame: Member Logon
    Cancel( ).click( );
    // ### module=e:\mck\TestDatastore\DefaultTestScriptDatastore\TMS_Scripts\sqabas32\demolib.sbl line=2
    // ### module=e:\mck\TestDatastore\DefaultTestScriptDatastore\TMS_Scripts\sqabas32\demolib.sbl line=3
    // Frame: ClassicsCD
    tree( ).click(atPath("Composers->Schubert->symphonies Nos. 5 & 9"));
    // ### module=e:\mck\TestDatastore\DefaultTestScriptDatastore\TMS_Scripts\sqabas32\demolib.sbl line=4
    // ### module=e:\mck\TestDatastore\DefaultTestScriptDatastore\TMS_Scripts\sqabas32\demolib.sbl line=6
    // ### module=e:\mck\TestDatastore\DefaultTestScriptDatastore\TMS_Scripts\sqabas32\demolib.sbl line=7
    // Frame: Member Logon
    Cancel( ).click( );
    // ### module=e:\mck\TestDatastore\DefaultTestScriptDatastore\TMS_Scripts\demo.rec

APPENDIX C-continued

Recorded Script

```
line=28
    // ### module=e:\mck\TestDatastore\DefaultTestScriptDatastore\TMS_Scripts\demo.rec
line=29
    // Frame: ClassicsCD
    tree( ).click(atPath("Composers->Schubert->Location(PLuS_MINUS)"));
        }
}
```

APPENDIX D

Flat Script

```
DEMO.JAVA.COMMENTED
import resources.demoHelper;
import com.rational.test.ft.*;
import com.rational.test.ft.object.interfaces.*;
import com.rational.test.ft.script.*;
import com.rational.test.ft.value.*;
import com.rational.test.ft.vp.*;
/**
 * Description : XDE Tester Script
 * @author av
 */
public class demo extends demoHelper
{
    /**
     * Script Name : <b>demo</b>
     * Generated   : <b>Jan 27, 2004 2:56:52 PM</b>
     * Modified    : <b>Jan 27, 2004 2:56:52 PM</b>
     * Description : XDE Tester Script
     * Original Host : WinNT Version 5.0 Build 2195 (Service Pack 4)
     *
     * @since 2004/01/27
     * @author av
     */
    public void testMain (Object[ ] args)
    {
    // ### module=e:\mck\TestDatastore\DefaultTestScriptDatastore\TMS_Scripts\demo.rec
line=12
    // ### Window SetTestContext, "Caption=ClassicsCD", ""
    // ### module=e:\mck\TestDatastore\DefaultTestScriptDatastore\TMS_Scripts\demo.rec
line=13
    //    ###   Result  =   JavaTreeVP   (CompareProperties,
"JavaCaption=ClassicsCD;\;Type=JavaTree;Index=1", "VP=Object Properties")
    tree_standardVP( ).performTest( );
    // ### module=e:\mck\TestDatastore\DefaultTestScriptDatastore\TMS_Scripts\demo.rec
line=14
    // ### Window ResetTestContext, "", ""
    // ### module=e:\mck\TestDatastore\DefaultTestScriptDatastore\TMS_Scripts\demo.rec
line=17
    // ### Window SetContext, "Caption=ClassicsCD", ""
    // ### module=e:\mck\TestDatastore\DefaultTestScriptDatastore\TMS_Scripts\demo.rec
line=18
    // ###   JavaTree  Expand,  "JavaCaption=ClassicsCD;\;Type=JavaTree;Index=1",
"Text=Composers->Schubert"
    // Frame: ClassicsCD
    tree( ).click(atPath("Composers->Schubert->Location(PLUS_MINUS)"));
    //                                                                        ###
module=e:\mck\TestDatastore\DefaultTestScriptDatastore\TMS_Scripts\sqabas32\demolib.sbl
line=2
    // ### Window SetContext, "Caption=ClassicsCD", ""
    //                                                                        ###
module=e:\mck\TestDatastore\DefaultTestScriptDatastore\TMS_Scripts\sqabas32\demolib.sbl
line=3
    // ### JavaTree MakeSelection, "JavaCaption=ClassicsCD;\;Type=JavaTree;Index=1",
"Text=" & param
    tree( ).click(atPath("Composers->Schubert->String Quartets Nos. 4 & 14"));
    //                                                                        ###
module=e:\mck\TestDatastore\DefaultTestScriptDatastore\TMS_Scripts\sqabas32\demolib.sbl
line=4
    // ### PushButton Click, "JavaCaption=ClassicsCD;\;Type=PushButton;Name=Place
Order"
    PlaceOrder( ).click( );
    //                                                                        ###
```

APPENDIX D-continued

Flat Script

```
module=e:\mck\TestDatastore\DefaultTestScriptDatastore\TMS_Scripts\sqabas32\demolib.sbl line=6
    // ### Window SetContext, "Caption=Member Logon", ""
    //                                                                    ###
module=e:\mck\TestDatastore\DefaultTestScriptDatastore\TMS_Scripts\sqabas32\demolib.sbl line=7
    //    ###    PushButton    Click,    "JavaCaption=Member Logon;\;Type=PushButton;Name=Cancel"
    // Frame: MemberLogon
    Cancel( ).click( );
    //                                                                    ###
module=e:\mck\TestDatastore\DefaultTestScriptDatastore\TMS_Scripts\sqabas32\demolib.sbl line=2
    // ### Window SetContext, "Caption=ClassicsCD", ""
    //                                                                    ###
module=e:\mck\TestDatastore\DefaultTestScriptDatastore\TMS_Scripts\sqabas32\demolib.sbl line=3
    // ### JavaTree MakeSelection, "JavaCaption=ClassicsCD;\;Type=JavaTree;Index=1", "Text=" & param
    // Frame: ClassicsCD
    tree( ).click(atPath("Composers->Schubert->Symphonies Nos. 5 & 9"));
    //                                                                    ###
module=e:\mck\TestDatastore\DefaultTestScriptDatastore\TMS_Scripts\sqabas32\demolib.sbl line=4
    // ### PushButton Click, "JavaCaption=ClassicsCD;\;Type=PushButton;Name=Place Order"
    //                                                                    ###
module=e:\mck\TestDatastore\DefaultTestScriptDatastore\TMS_Scripts\sqabas32\demolib.sbl line=6
    // ### Window SetContext, "Caption=Member Logon", ""
    //                                                                    ###
module=e:\mck\TestDatastore\DefaultTestScriptDatastore\TMS_Scripts\sqabas32\demolib.sbl line=7
    //    ###    PushButton    Click,    "JavaCaption=Member Logon;\;Type=PushButton;Name=Cancel"
    // Frame: Member Logon
    Cancel( ).click( );
    // ### module=e:\mck\TestDatastore\DefaultTestScriptDatastore\TMS_Scripts\demo.rec line=28
    // ### Window SetContext, "Caption=ClassicsCD", ""
    // ### module=e:\mck\TestDatastore\DefaultTestScriptDatastore\TMS_Scripts\demo.rec line=29
    //  ###  JavaTree  Collapse,  "JavaCaption=ClassicsCD;\;Type=JavaTree;Index=1", "Text=Composers->Schubert"
    // Frame: ClassicsCD
    tree( ).click(atPath("Composers->Schubert->Location(PLUS_MINUS)"));
        }
}
```

APPENDIX E

Augmented Script

```
DEMO.BAS
    '$include 'demolib.sbl'
    Sub Main
        Dim Result As Integer
        Dim names(2) as string
        Dim i as integer
        names(1) = "Composers->Schubert->String Quartets Nos. 4 & 14"
        names(2) = "Composers->Schubert->Symphonies Nos. 5 & 9"
        'Initially Recorded: 4/9/2003 12:33:25 PM
        'Script Name: demo
        ' ### module=e:\mck\TestDatastore\DefaultTestScriptDatastore\TMS_Scripts\demo.rec line=12
        Window SetTestContext, "Caption=ClassicsCD", ""
        ' ### module=e:\mck\TestDatastore\DefaultTestScriptDatastore\TMS_Scripts\demo.rec line=13
        Result    =    JavaTreeVP    (CompareProperties, "JavaCaption=ClassicsCD;\;Type=JavaTree;Index=1", "VP=Object Properties")
        ' ### module=e:\mck\TestDatastore\DefaultTestScriptDatastore\TMS_Scripts\demo.rec line=14
        Window ResetTestContext, "", ""
        if Result then
```

APPENDIX E-continued

Augmented Script

```
    ' ### module=e:\mck\TestDatastore\DefaultTestScriptDatastore\TMS_Scripts\demo.rec line=17
        Window SetContext, "Caption=ClassicsCD", ""
    ' ### module=e:\mck\TestDatastore\DefaultTestScriptDatastore\TMS_Scripts\demo.rec line=18
        JavaTree    Expand,    "JavaCaption=ClassicsCD;\;Type=JavaTree;Index=1", "Text=Composers->Schubert"
    else
    ' ### module=e:\mck\TestDatastore\DefaultTestScriptDatastore\TMS_Scripts\demo.rec line=20
        Window SetContext, "Caption=ClassicsCD", ""
    ' ### module=e:\mck\TestDatastore\DefaultTestScriptDatastore\TMS_Scripts\demo.rec line=21
        JavaTree    Expand,    "JavaCaption=ClassicsCD;\;Type=JavaTree;Index=1", "Text=Composers->Schubert"
    end if
    for i = 1 to 2
        call func (names(i))
    next i
    ' ### module=e:\mck\TestDatastore\DefaultTestScriptDatastore\TMS_Scripts\demo.rec line=28
        Window SetContext, "Caption=ClassicsCD", ""
    ' ### module=e:\mck\TestDatastore\DefaultTestScriptDatastore\TMS_Scripts\demo.rec line=29
        JavaTree    Collapse,    "JavaCaption=ClassicsCD;\;Type=JavaTree;Index=1", "Text=Composers->Schubert"
End Sub
DEMOLIB.BAS
sub func (param as string)
    '                                                                           ### module=e:\mck\TestDatastore\DefaultTestScriptDatastore\TMS_Scripts\sqabas32\demolib.sbl line=2
        Window SetContext, "Caption=ClassicsCD", ""
    '                                                                           ### module=e:\mck\TestDatastore\DefaultTestScriptDatastore\TMS_Scripts\sqabas32\demolib.sbl line=3
        JavaTree MakeSelection, "JavaCaption=ClassicsCD;\;Type=JavaTree;Index=1", "Text=" & param
    '                                                                           ### module=e:\mck\TestDatastore\DefaultTestScriptDatastore\TMS_Scripts\sqabas32\demolib.sbl line=4
        PushButton Click, "JavaCaption=ClassicsCD;\;Type=PushButton;Name=Place Order"
    '                                                                           ### module=e:\mck\TestDatastore\DefaultTestScriptDatastore\TMS_Scripts\sqabas32\demolib.sbl line=6
        Window SetContext, "Caption=Member Logon", ""
    '                                                                           ### module=e:\mck\TestDatastore\DefaultTestScriptDatastore\TMS_Scripts\sqabas32\demolib.sbl line=7
        PushButton Click, "JavaCaption=Member Logon;\;Type=PushButton;Name=Cancel"
end sub
```

APPENDIX F

Converted Script

```
DEMO.JAVA.CONVERTED
package #convert_temp#;
import Project1;
import diamondedge.vb.*;
import diamondedge.ado.*;
import java.awt.*;
import javax.swing.*;
public class demo
{
  public Variant SetTestContext = new Variant( );
  public Variant CompareProperties = new Variant( );
  public Variant ResetTestContext = new Variant( );
  public Variant SetContext = new Variant( );
  public Variant Expand = new Variant( );
  public Variant Collapse = new Variant( );
/**
 * $include 'demolib.sbl'
 */
```

APPENDIX F-continued

Converted Script

```
public static void Main( )
{
try
{
int Result = 0;
String[ ] names = new String[3];
int i = 0;
names[1] = "Composers->Schubert->String Quartets Nos. 4 & 14";
names[2] = "Composers->Schubert->Symphonies Nos. 5 & 9";
//Initially Recorded: 4/9/2003 12:33:25 PM
//Script Name: demo
// ### module=e:\mck\TestDatastore\DefaultTestScriptDatastore\TMS_Scripts\demo.rec line=12
   Window( SetTestContext, "Caption=ClassicsCD", "" );
// ### module=e:\mck\TestDatastore\DefaultTestScriptDatastore\TMS_Scripts\demo.rec line=13
   Result         =          JavaTreeVP(         CompareProperties,
"JavaCaption=ClassicsCD;\\;Type=JavaTree;Index=1", "VP=Object Properties" ).toInt( );
// ### module=e:\mck\TestDatastore\DefaultTestScriptDatastore\TMS_Scripts\demo.rec line=14
   Window( ResetTestContext, "", "" );
   if( ((Result) != 0) )
   {
    // ### module=e:\mck\TestDatastore\DefaultTestScriptDatastore\TMS_Scripts\demo.rec line=17
     Window( SetContext, "Caption=ClassicsCD", "" );
    // ### module=e:\mck\TestDatastore\DefaultTestScriptDatastore\TMS_Scripts\demo.rec line=18
     JavaTree(   Expand,    "JavaCaption=ClassicsCD;\\;Type=JavaTree;Index=1",
"Text=Composers->Schubert" );
   }
   else
   {
    // ### module=e:\mck\TestDatastore\DefaultTestScriptDatastore\TMS_Scripts\demo.rec line=20
     Window( SetContext, "Caption=ClassicsCD", "" );
    // ### module=e:\mck\TestDatastore\DefaultTestScriptDatastore\TMS_Scripts\demo.rec line=21
     JavaTree(   Expand,    "JavaCaption=ClassicsCD;\\;Type=JavaTree;Index=1",
"Text=Composers->Schubert" );
   }
   for( i = 1; i <= 2; i++ )
   {
    #convert_temp#.demolib.func( names[i] );
   }
// ### module=e:\mck\TestDatastore\DefaultTestScriptDatastore\TMS_Scripts\demo.rec line=28
   Window( SetContext, "Caption=ClassicsCD", "" );
// ### module=e:\mck\TestDatastore\DefaultTestScriptDatastore\TMS_Scripts\demo.rec line=29
   JavaTree(   Collapse,    "JavaCaption=ClassicsCD;\\;Type=JavaTree;Index=1",
"Text=Composers->Schubert" );
}
  catch(Exception _e_) { Err.set(_e_,"Main"); }
}
}
DEMOLIB.JAVA.CONVERTED
package #convert_temp#;
import Project1;
import diamondedge.vb.*;
import diamondedge.ado.*;
import java.awt.*;
import javax.swing.*;
public class demolib
{
 public Variant MakeSelection = new Variant( );
 public Variant Click = new Variant( );
 public static void func( String param )
 {
  try
  {
   //                                                                    ### module=e:\mck\TestDatastore\DefaultTestScriptDatastore\TMS_Scripts\sqabas32\demolib.sbl line=2
     Window( #convert_temp#.demo.SetContext, "Caption=ClassicsCD", "" );
   //                                                                    ### module=e:\mck\TestDatastore\DefaultTestScriptDatastore\TMS_Scripts\sqabas32\demolib.sbl
```

APPENDIX F-continued

Converted Script

```
line=3
    JavaTree( MakeSelection, "JavaCaption=ClassicsCD;\\;Type=JavaTree;Index=1", "Text="
+ param );
    //                                                                          ###
module=e:\mck\TestDatastore\DefaultTestscriptDatastore\TMS_Scripts\sqabas32\demolib.sbl
line=4
    PushButton( Click, "JavaCaption=ClassicsCD;\\;Type=PushButton;Name=Place Order" );
    //                                                                          ###
module=e:\mck\TestDatastore\DefaultTestScriptDatastore\TMS_Scripts\sqabas32\demolib.sbl
line=6
    Window( #convert_temp#.demo.SetContext, "Caption=Member Logon", "" );
    //                                                                          ###
module=e:\mck\TestDatastore\DefaultTestScriptDatastore\TMS_Scripts\sqabas32\demolib.sbl
line=7
    PushButton( Click, "JavaCaption=Member Logon;\\;Type=PushButton;Name=Cancel" );
  }
  catch(Exception _e_) { Err.set(_e_,"func"); }
 }
}
```

APPENDIX G

Merged Script

```
DEMO.JAVA.MERGED
package #convert_temp#;
import Project1;
import diamondedge.vb.*;
import diamondedge.ado.*;
import java.awt.*;
import javax.swing.*;
public class demo
{
  public Variant SetTestContext = new Variant( );
  public Variant CompareProperties = new Variant( );
  public Variant ResetTestContext = new Variant( );
  public Variant SetContext = new Variant( );
  public Variant Expand = new Variant( );
  public Variant Collapse = new Variant( );
  /**
   * $include 'demolib.sbl'
   */
  public static void Main( )
  {
   try
   {
    int Result = 0;
    String[ ] names = new String[3];
    int i = 0;
    names[1] = "Composers->Schubert->String Quartets Nos. 4 & 14";
    names[2] = "Composers->Schubert->Symphonies Nos. 5 & 9";
    //Initially Recorded: 4/9/2003 12:33:25 PM
    //Script Name: demo
    Result = to_int(tree_standardVP( ).performTest( ));
    if( ((Result) != 0))
    {
     // Frame: ClassicsCD
     tree( ).click(atPath("Composers->Schubert->Location(PLUS_MINUS)"));
    }
    else
    {
     // ### sqa basic source line below not converted during record and playback.
     // ### module=e:\mck\TestDatastore\DefaultTestScriptDatastore\TMS_Scripts\demo.rec
line=21
     // ###   JavaTree( Expand,  "JavaCaption=ClassicsCD;\\;Type=JavaTree;Index=1",
"Text=Composers->Schubert" );
    }
    for( i = 1; i <= 2; i++ )
    {
     #convert_temp#.demolib.func( names[i] );
    }
    // Frame: ClassicsCD
    tree( ).click(atPath("Composers->Schubert->Location(PLUS_MINUS)"));
   }
```

APPENDIX G-continued

Merged Script

```
  catch(Exception _e_) { Err.set(_e_,"Main"); }
 }
}
DEMOLIB.JAVA.MERGED
package #convert_temp#;
import Project1;
import diamondedge.vb.*;
import diamondedge.ado.*;
import java.awt.*;
import javax.swing.*;
public class demolib
{
 public Variant MakeSelection = new Variant( );
 public Variant Click = new Variant( );
 public static void func( String param )
 {
  try
  {
   // ### variables used in next lines. Please check for correctness
   tree( ).click(atPath(param));
   PlaceOrder( ).click( );
   // Frame: Member Logon
   Cancel( ).click( );
  }
  catch(Exception _e_) { Err.set(_e_,"func"); }
 }
}
```

APPENDIX H

Final Script

```
DEMO.JAVA
import resources.demoHelper;
import com.rational.test.ft.*;
import com.rational.test.ft.object.interfaces.*;
import com.rational.test.ft.script.*;
import com.rational.test.ft.value.*;
import com.rational.test.ft.vp.*;
/**
 * Description : XDE Tester Script
 * @author av
 */
public class demo extends demoHelper
{
 /**
 * Script Name  : <b>demo</b>
 * Generated    : <b>Jan 27, 2004 2:56:52 PM</b>
 * Modified     : <b>Jan 27, 2004 2:56:52 PM</b>
 * Description  : XDE Tester Script
 * Original Host : WinNT Version 5.0 Build 2195 (Service Pack 4)
 *
 * @since 2004/01/27
 * @author av
 */
 demolib demolibObject = new demolib( );
 public int to_int (boolean param)
 {
  if (param) return 1;
  else return 0;
 }
 /**
 * $include 'demolib.sbl'
 */
 public void testMain (Object[ ] args)
 {
  int Result = 0;
  String[ ] names = new String[3];
  int i = 0;
  names[1] = "Composers->Schubert->String Quartets Nos. 4 & 14";
  names[2] = "Composers->Schubert->Symphonies Nos. 5 & 9";
  //Initially Recorded: 4/9/2003 12:33:25 PM
  //Script Name: demo
  Result = to_int(tree_standardVP( ).performTest( ));
```

APPENDIX H-continued

Final Script

```
if( ((Result) != 0) )
{
  // Frame: ClassicsCD
  tree( ).click(atPath("Composers->Schubert->Location(PLUS_MINUS)"));
}
else
{
  // ### sqa basic source line below not converted during record and playback.
  // ### module=e:\mck\TestDatastore\DefaultTestScriptDatastore\TMS_Scripts\demo.rec line=21
  //  ###   JavaTree(  Expand,  "JavaCaption=ClassicsCD;\\;Type=JavaTree;Index=1", "Text=Composers->Schubert");
}
for( i = 1; i <= 2; i++)
{
  demolibObject.func( names[i] );
}
// Frame: ClassicsCD
tree( ).click(atPath("Composers->Schubert->Location(PLUS_MINUS)"));
}
}
DEMOLIB.JAVA
import resources.demoHelper;
import com.rational.test.ft.*;
import com.rational.test.ft.object.interfaces.*;
import com.rational.test.ft.script.*;
import com.rational.test.ft.value.*;
import com.rational.test.ft.vp.*;
/**
 * Description   : XDE Tester Script
 * @author av
 */
public class demolib extends demoHelper
{
  public int to_int (boolean param)
  {
    if (param) return 1;
    else return 0;
  }
  public void testMain (Object[ ] args)
  {
  }
  public void func( String param)
  {
    // ### variables used in next lines. Please check for correctness
    tree( ).click(atPath(param));
    PlaceOrder( ).click( );
    // Frame: Member Logon
    Cancel( ).click( );
  }
```

What is claimed is:

1. A method for converting a current test script intended for use in a current test tool (CTT), to a recorded script intended for use in a new test tool (NTT), said method comprising:

providing the CTT capable of playing back actions of said current test script in a playback mode;

providing the NTT capable of recording actions and for creating a test script from the recorded actions;

providing a communication channel between the CTT and the NTT;

a processor of a computer system running the CTT in the playback mode, causing the CTT to produce actions, create objects and modify objects;

running the NTT to execute the current test script in a record mode;

during said running the CTT in the playback mode and said running the NTT in the record mode, transmitting items through the communication channel from the CTT to the NTT, said items comprising the actions produced by the CTT, indications of the objects created by the CTT, and indications of the objects modified by the CTT;

responsive to the NTT receiving the items transmitted by the CTT through the communication channel during said running the NTT in the record mode, said NTT recording the items in the recorded script having a same functionality as that of the current test script;

adding a Sendcomment statement to the current test script to identify an application-specific statement in the current test script;

responsive to execution of the Sendcomment statement in the current test script during said running the CTT in the playback mode, sending an insert-comment message from the CTT to the NTT via the communication channel, said insert-comment message comprising a comment identifying the application-specific statement;

responsive to the NTT receiving the insert-comment message sent by the CTT, said NTT adding the comment to the recorded script during said running the NTT in the record mode.

2. The method of claim 1, further comprising the steps of:
translating the current test script from its current language to a converted script having a language compatible with the NTT;
replacing in the converted script the application-specific statement identified by the comment, with an equivalent application-specific statement relating to the NTT.

3. The method of claim 1, wherein the recorded indications of the objects created and the objects modified comprise:
object definitions of the objects created and object states of the objects modified.

4. The method of claim 1, wherein the CTT comprises:
a publicly available functional testing software product capable of playing back actions of said current test script in the playback mode.

5. The method of claim 1, wherein the NTT comprises:
a publicly available functional testing software product capable of recording actions and for creating the test script from the recorded actions.

6. The method of claim 1, wherein the application-specific statement is a graphics user interface (GUI) statement.

7. The method of claim 1, wherein the application-specific statement is a verification point (VP) statement.

8. A method of providing a service for converting a current test script intended for use in a current test tool (CTT), to a recorded script intended for use in a new test tool (NTT), said method comprising:
providing the CTT capable of playing back actions of said current test script in a playback mode;
providing the NTT capable of recording actions and for creating a test script from the recorded actions;
providing a communication channel between the CTT and the NTT;
a processor of a computer system running the CTT in the playback mode, causing the CTT to produce actions, create objects and modify objects;
running the NTT to execute the current test script in a record mode;
during said running the CTT in the playback mode and said running the NTT in the record mode, transmitting items through the communication channel from the CTT to the NTT, said items comprising the actions produced by the CTT, indications of the objects created by the CTT, and indications of the objects modified by the CTT;
responsive to the NTT receiving the items transmitted by the CTT through the communication channel during said running the NTT in the record mode, said NTT recording the items in the recorded script having a same functionality as that of the current test script;
adding a Sendcomment statement to the current test script to identify an application-specific statement in the current test script;
responsive to execution of the Sendcomment statement in the current test script during said running the CTT in the playback mode, sending an insert-comment message from the CTT to the NTT via the communication channel, said insert-comment message comprising a comment identifying the application-specific statement;
responsive to the NTT receiving the insert-comment message sent by the CTT, said NTT adding the comment to the recorded script during said running the NTT in the record mode.

9. The method of claim 8, said method further comprising:
translating the current test script from its current language to a converted script having a language compatible with the NTT;
replacing in the converted script the application-specific statement identified by the comment, with an equivalent application-specific statement relating to the NTT.

10. The method of claim 8, wherein the recorded indications of the objects created and the objects modified comprise:
object definitions of the objects created and object states of the objects modified.

11. The method of claim 8, wherein the CTT comprises:
a publicly available functional testing software product capable of playing back actions of said current test script in the playback mode.

12. The method of claim 8, wherein the NTT comprises:
a publicly available functional testing software product capable of recording actions and for creating the test script from the recorded actions.

13. The method of claim 8, wherein the application-specific statement is a graphics user interface (GUI) statement.

14. The method of claim 8, wherein the application-specific statement is a verification point (VP) statement.

15. A computer program product, comprising a computer readable storage medium having computer readable program code stored therein, said program code configured to be executed on a processor of a computer system to perform a method for converting a current test script intended for use in a current test tool (CTT), to a recorded script intended for use in a new test tool (NTT), said method comprising:
providing the CTT capable of playing back actions of said current test script in a playback mode;
providing the NTT capable of recording actions and for creating a test script from the recorded actions;
providing a communication channel between the CTT and the NTT;
running the CTT in the playback mode, causing the CTT to produce actions, create objects and modify objects;
running the NTT to execute the current test script in a record mode;
during said running the CTT in the playback mode and said running the NTT in the record mode, transmitting items through the communication channel from the CTT to the NTT, said items comprising the actions produced by the CTT, indications of the objects created by the CTT, and indications of the objects modified by the CTT; and
responsive to the NTT receiving the items transmitted by the CTT through the communication channel during said running the NTT in the record mode, said NTT recording the terms in the recorded script having a same functionality as that of the current test script;
adding a Sendcomment statement to the current test script to identify an application-specific statement in the current test script;
responsive to execution of the Sendcomment statement in the current test script during said running the CTT in the playback mode, sending an insert-comment message from the CTT to the NTT via the communication channel, said insert-comment message comprising a comment identifying the application-specific statement;
responsive to the NTT receiving the insert-comment message sent by the CTT, said NTT adding the comment to the recorded script during said running the NTT in the record mode.

16. The computer program product of claim 15, wherein the method further comprises:
translating the current test script from its current language to a converted script having a language compatible with the NTT;

replacing in the converted script the application-specific statement identified by the comment, with an equivalent application-specific statement relating to the NTT.

17. The computer program product of claim 15, wherein the CTT comprises:
   a publicly available functional testing software product capable of playing back actions of said current test script in the playback mode.

18. The computer program product of claim 15, wherein the NTT comprises:
   a publicly available functional testing software product capable of recording actions and for creating the test script from the recorded actions.

19. The computer program product of claim 16, wherein the recorded indications of the objects created and the objects modified comprise:
   object definitions of the objects created and object states of the objects modified.

20. The computer program product of claim 15, wherein the application-specific statement is a graphics user interface (GUI) statement.

21. The method computer program product of claim 15, wherein the application-specific statement is a verification point (VP) statement.

22. A computer system comprising a processor, a computer readable storage medium, and program code stored on the medium, said program code configured to be executed on the processor to implement a method for converting a current test script intended for use in a current test tool (CTT), to a recorded script intended for use in a new test tool (NTT), said method comprising:
   providing the CTT capable of playing back actions of said current test script in a playback mode;
   providing the NTT capable of recording actions and for creating a test script from the recorded actions;
   providing a communication channel between the CTT and the NTT;
   running the CTT to execute the current test script in the playback mode, causing the CTT to produce actions, create objects and modify objects;
   running the NTT in a record mode;
   during said running the CTT in the playback mode and said running the NTT in the record mode, transmitting items through the communication channel from the CTT to the NTT, said items comprising the actions produced by the CTT, indications of the objects created by the CTT, and indications of the objects modified by the CTT;
   responsive to the NTT receiving the items transmitted by the CTT through the communication channel during said running the NTT in the record mode, said NTT recording the items in the recorded script having a same functionality as that of the current test script;
   adding a Sendcomment statement to the current test script to identify an application-specific statement in the current test script;
   responsive to execution of the Sendcomment statement in the current test script during said running the CTT in the playback mode, sending an insert-comment message from the CTT to the NTT via the communication channel, said insert-comment message comprising a comment identifying the application-specific statement;
   responsive to the NTT receiving the insert-comment message sent by the CTT, said NTT adding the comment to the recorded script during said running the NTT in the record mode.

23. The computer system of claim 22, further comprising the steps of:
   translating the current test script from its current language to a converted script having a language compatible with the NTT;
   replacing in the converted script the application-specific statement identified by the comment, with an equivalent application-specific statement relating to the NTT.

24. The computer system of claim 22, wherein the recorded indications of the objects created and the objects modified comprise:
   object definitions of the objects created and object states of the objects modified.

25. The computer system of claim 22, wherein the CTT comprises:
   a publicly available functional testing software product capable of playing back actions of said current test script in the playback mode.

26. The computer system of claim 22, wherein the NTT comprises:
   a publicly available functional testing software product capable of recording actions and for creating the test script from the recorded actions.

27. The computer system of claim 22, wherein the application-specific statement is a graphics user interface (GUI) statement.

28. The computer system of claim 22, wherein the application-specific statement is a verification point (VP) statement.

* * * * *